US007411989B2

(12) United States Patent
Spinelli et al.

(10) Patent No.: US 7,411,989 B2
(45) Date of Patent: Aug. 12, 2008

(54) MECHANICALLY Q-SWITCHED $CO_2$ LASER (75) Inventors: Luis A. Spinelli, Sunnyvale, CA (US); Anthony J. DeMaria, W. Suffield, CT (US); Vernon Seguin, Windsor, CT (US)

(73) Assignee: Coherent, Inc., Santa Clara, CA (US)

( * ) Notice: Subject to any disclaimer, the term of this patent is extended or adjusted under 35 U.S.C. 154(b) by 0 days.

(21) Appl. No.: 11/638,645

(22) Filed: Dec. 13, 2006

(65) Prior Publication Data
US 2008/0144675 A1 Jun. 19, 2008

(51) Int. Cl.
*H01S 3/22* (2006.01)
*H01S 3/08* (2006.01)
(52) U.S. Cl. ............... 372/55; 372/15; 372/99; 372/107
(58) Field of Classification Search ............ 372/15, 372/26, 28, 30, 55, 92, 99, 107
See application file for complete search history.

(56) References Cited

U.S. PATENT DOCUMENTS

| | | | | |
|---|---|---|---|---|
| 3,622,909 | A | * | 11/1971 | Woodcock et al. ............ 372/16 |
| 5,170,089 | A | | 12/1992 | Fulton ........................ 310/328 |
| 5,281,812 | A | | 1/1994 | Lee et al. ..................... 250/235 |
| 5,536,926 | A | | 7/1996 | Ikeda et al. .................. 235/462 |
| 5,572,453 | A | | 11/1996 | Miyake et al. ............... 364/736 |
| 5,572,543 | A | | 11/1996 | Heinemann et al. ......... 372/107 |
| 6,192,061 | B1 | | 2/2001 | Hart et al. ..................... 372/87 |
| 6,288,816 | B1 | | 9/2001 | Melville et al. .............. 359/199 |
| 6,359,370 | B1 | | 3/2002 | Chang ........................ 310/328 |
| 6,788,722 | B1 | | 9/2004 | Kennedy et al. .............. 372/64 |
| 7,038,093 | B2 | | 5/2006 | Bianchi et al. .............. 568/803 |
| 2004/0004775 | A1 | | 1/2004 | Turner et al. ................ 359/877 |
| 2005/0179976 | A1 | | 8/2005 | Davis et al. .................. 359/224 |

OTHER PUBLICATIONS

U.S. Appl. No. 11/434,624, filed May 16, 2006, entitled Low Power Q-Switched Solid-State Lasers, by Luis A. Spinelli et al.
G.M. Flynn et al., "4B5—Progress and Applications of Q-Switching Techniques Using Molecular Gas Lasers," *IEEE Journal of Quantum Electronics.*, vol. QE-2, No. 9, Sep. 1966, pp. 378-381.
Yves-Alain Peter et al., "Pulsed fiber laser using micro-electro-mechanical mirrors," *Optical Engineering.*, vol. 38, No. 4, Apr. 1999, pp. 636-640.

* cited by examiner

*Primary Examiner*—Armando Rodriguez
(74) *Attorney, Agent, or Firm*—Stallman & Pollock LLP (57) ABSTRACT

A $CO_2$ laser has a resonator mirror that oscillates about an axis perpendicular to the resonator axis through an angular range of oscillation sufficient that the resonator is only able to deliver radiation for a fraction of an oscillation period of the mirror. In one example of the laser, the oscillating mirror is an end-mirror of the resonator. In another example, the oscillating mirror is a fold mirror of the resonator.

20 Claims, 7 Drawing Sheets

MECHANICALLY Q-SWITCHED CO₂ LASER

TECHNICAL FIELD OF THE INVENTION

The present invention relates in general to Q-switched pulsed lasers. The invention relates in particular to Q-switched pulsed carbon dioxide ($CO_2$) lasers.

DISCUSSION OF BACKGROUND ART $CO_2$ lasers typically deliver radiation having a wavelength between about 9 and 11 micrometers ($\mu m$), with 10.6 $\mu m$, for which gain is highest, being a common output wavelength. Wavelengths in this range are strongly absorbed by materials including ceramics, glasses, plastics, wood, paints, and paper. This makes a $CO_2$ a preferred laser for material processing applications involving these materials. Such applications include marking and drilling.

Many of these material processing applications require pulsed $CO_2$ lasers having relatively high peak pulse powers, for example, 1 kilowatt (KW) or greater at relatively low average powers, for example, 50 Watts (W) or less. High pulse repetition frequencies (PRF), for example, between about a 10 kilohertz (KHz) and 100 KHz, and good mode-quality are also required.

Sealed-off, radio-frequency (RF) excited, Q-switched, diffusion-cooled $CO_2$ laser are preferred for such applications, particularly if a high PRF is obtainable. The high PRF is important because the average output power of a pulsed, diffusion cooled $CO_2$ laser increases with increasing PRF. The peak power of the Q-switched pulses decreases with increasing PRF beyond about 20 KHz. The average power becomes about equal to the continuous wave (CW) power at a PRF of about 100 KHz.

For maximizing average output power a $CO_2$ laser needs to operate at a higher PRF than would be required for maximizing average power in a solid-state laser. This is because the $CO_2$ molecule has a much faster, for example, about two orders of magnitude faster relaxation time of the upper excited laser state than common solid-state gain-media such as Nd:YAG and Nd:YVO₄. Usually, a minimum acceptable PRF for $CO_2$ laser material processing applications on the above-referenced materials is around 20 KHz.

In commercially available $CO_2$ lasers, the usual means for Q-switching is a cadmium telluride (CdTe) electro-optic (E-O) crystal switch. A Q-switched laser operated by a CdTe E-O crystal switch is described in U.S. Pat. No. 7,038,093 assigned to the assignee of the present invention and incorporated herein by reference. The cost of a CdTe E-O switch is relatively high and can represent between about 25% and 30% of the total cost of a Q-switched $CO_2$ laser. The E-O CdTe crystals are expensive, difficult to grow, difficult to polish and there are few suppliers thereof worldwide. Fast high-voltage electronic circuitry is required to drive a CdTe E-O switch. This circuitry is expensive and difficult to design. Intercavity optical components, such as polarizers and polarization rotators, cooperative with a CdTe E-O crystal, are required to provide the Q-switching. Such components, and indeed the CdTe crystal, introduce significant optical losses within the laser resonant cavity. Such losses, coupled with other resonator losses characteristic of $CO_2$ lasers, can reduce the average output power by 30% or more at 100 kHz PRF compared with the CW average output power.

In the early years of development of the laser, attempts were made to mechanically Q-switch both $CO_2$ and solid-state lasers using a rotating mirror or a rotating prism as an end-mirror of the laser resonant cavity to periodically convert the laser resonant cavity from a high loss (misaligned) to a low loss (aligned) state. Short-duration flash-lamps were used to optically pump the solid-state lasers to obtain one Q-switched output pulse per flash-lamp pulse. The rotating mirrors were driven by small electric motors or gas turbines. In order to obtain a fast optical switching time, required for fast-rise-time Q-switched pulses, a correspondingly fast rotational speed was needed. The fast rotational speed required a high degree of mechanical balancing for the rotating mirrors which added appreciable cost to the Q-switch laser.

These early mechanical Q-switching techniques were, and are still not suitable for the above-discussed material processing applications. The PRF obtainable is at best in the several hundreds of pulses-per-second range instead of in the multi KHz range required. Although there has been an awareness of these early mechanical Q-switching experiments, mechanical Q-switching is not included in any commercially available gas or solid-state laser. There is a need for a method of mechanical Q-switching that can provide Q-switching of a $CO_2$ laser at PRFs in the kilohertz range required for material processing applications.

SUMMARY OF THE INVENTION

The present invention is directed to providing a mechanically Q-switched $CO_2$ laser. In one aspect of the invention the laser includes an enclosure containing a laser gas. A laser resonator including first and second resonator end-mirrors has a longitudinal resonator-axis extending through the lasing gas in the enclosure. An electrical pumping arrangement is provided for energizing the laser gas. The first mirror is oscillatable at a predetermined frequency about an axis perpendicular to the longitudinal resonator-axis through an angular range of oscillation extending from one side of an optimal alignment plane of the mirror to the other. The frequency of oscillation of the first mirror and the angular range of oscillation are selected such that when the laser gas is energized by the electrical pumping arrangement and the first mirror is oscillating, the laser delivers a laser pulse twice during each oscillating period of the first mirror.

In another aspect of the invention the laser includes one common end-mirror, a fold mirror oscillatable as described above and a plurality N of temporary (supplementary) end mirrors. Oscillating the fold mirror while the lasing gas is energized sweeps the resonator axis over the temporary end-mirrors such that the resonator is terminated by each one of the temporary end-mirrors twice during an oscillating period of the fold mirror. This causes 2N laser pulses to be delivered from the laser resonator during an oscillation period of the fold mirror. This arrangement is able to provide a relatively high PRF of pulses delivered by the laser for a relatively low oscillation frequency of the fold mirror. By way of example with 5 temporary end-mirrors and an oscillation period of the mirror of 10 KHz, the PRF of the laser is 100 KHz.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Figure 1:
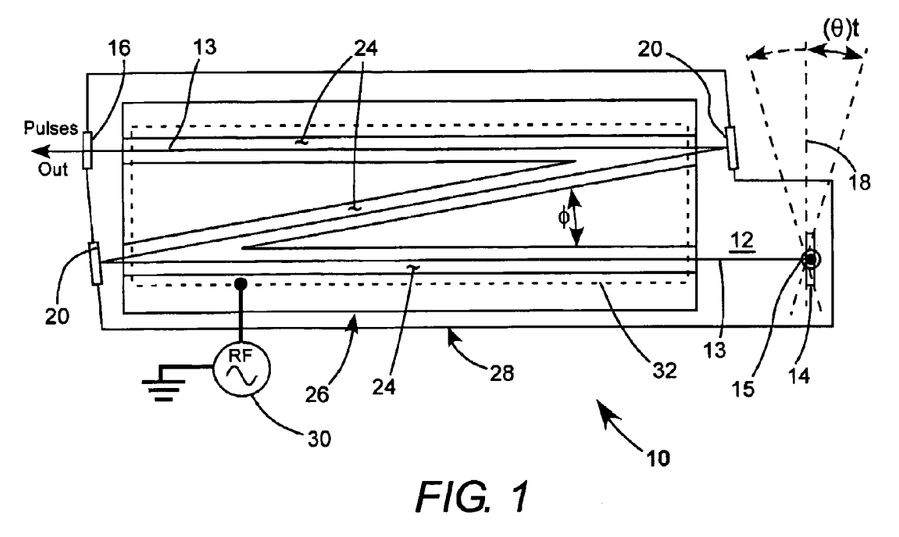
FIG. 1 schematically illustrates one preferred embodiment of a mechanically Q-switched, $CO_2$ laser in accordance with the present invention including a twice-folded, three-channel, wave-guide laser-resonator terminated at one end thereof by a fixed output-coupling mirror and at an opposite end thereof by a Q-switch mirror oscillating about an axis perpendicular to the longitudinal axis of the resonator.
Figure 2:
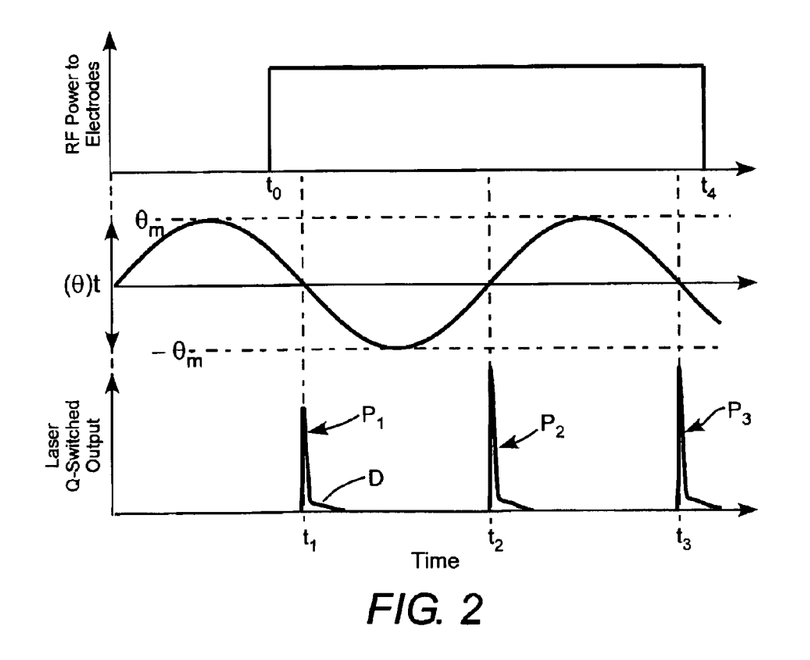
FIG. 2 is a timing diagram schematically illustrating one example of operation of the laser of FIG. 1, wherein the resonator is energized by an RF pulses having a duration slightly longer than an oscillation period of the Q-switch mirror, with laser pulses being generated when the Q-switch mirror is swept through a zero-crossing point of a scan (sweep) function $\theta(t)=\theta_m \sin(2\pi ft)$ where t is time, $\theta_m$ is the maximum half angle of the Q-switch mirror oscillation, and f is the frequency of the Q-switch mirror oscillation.

Referring now to the drawings, wherein like components are designated by like reference numerals, FIG. 1 illustrates a preferred embodiment of a Q-switched pulsed $CO_2$ laser 10 in accordance with the present invention. FIG. 2 is a timing diagram graphically depicting operation characteristics of the laser.

Laser 10 includes a housing 28 filled with a lasing gas mixture including $CO_2$ and at least one inert gas. One preferred gas mixture is a $CO_2$:nitrogen ($N_2$):helium (He) gas mixture at about 80 to 100 Torr pressure. A laser resonator 12 is terminated by a fixed mirror 16, sealed to the housing, and a mirror 14, here, within the housing. Mirror 14 is periodically tiltable (oscillatable), about an axis 15 perpendicular to the longitudinal resonator axis 13, through angles $\pm\theta_m$ on opposite sides of an optimum alignment plane 18, perpendicular to a longitudinal axis of the resonator. Locating mirror 14 within the resonator is preferred as far as minimizing optical losses is concerned. The mirror could also be located outside the housing in optical communication with the resonator via a window in the housing, such as a zinc selenide (ZnSe) window. This would provide convenient access to the oscillating mechanism of the mirror, for example, for selecting different angular alignments thereof, and is the arrangement used in experiments and other embodiments of the present invention described hereinbelow.

Mirror 14 is maximally reflective, for example greater than 99% reflective, at the fundamental wavelength of the laser. Mirror 16 is partially reflective and partially transmissive at the fundamental wavelength of the laser and serves to couple output pulses out of the laser resonator. As mirror 14 is being periodically tilted (oscillated), the divergence angle $\theta$ from plane 18 at any time t can be defined by an equation:

$$\theta(t)=\theta_m \sin(2\pi ft) \quad (1)$$

Where f is the oscillation frequency of mirror 18 (see FIG. 2).

Axis 13 of resonator 12 is folded into a Z-shape by fold mirrors 20 also sealed into housing 28. The resonator axis extends through three rectangular waveguide channels 24, at an angle $\phi$ to each other, machined in a ceramic block 26. The angle $\phi$ may be between about 2 degrees and 7 degrees depending on limitations placed on the width of the laser. A preferred value for angle φ is about 4 degrees.

The waveguide channels control the lasing mode of the laser in cooperation with mirrors 14, 16, 20 and 22. The lasing gas in housing 11 fills the waveguide channels and is energized when required by an RF potential from a generator 30 connected to an electrode 32 within the housing and extending over the waveguide channels as illustrated in phantom in FIG. 1.

It should be noted, here, that only a limited description of the folded resonator and waveguide arrangement is presented here sufficient to explain the principles of mechanical Q-switching in accordance with the present invention. A detailed description of folded-resonator $CO_2$ waveguide lasers is presented in U.S. Pat. No. 6,192,061 and U.S. Pat. No. 6,788,722, the complete disclosures of which are hereby incorporated herein by reference.

Referring in particular to FIG. 2, with mirror 14 oscillating about axis 15, RF power is applied to electrode 32 in the form of a pulse (RF) beginning at time $t_0$ and having a duration somewhat longer than about 1/f, where f is the oscillating frequency of the mirror. The maximum angular excursion (misalignment from the optimum alignment plane) is $\theta_m$. The frequency of oscillation and the maximum excursion angle $\theta_m$ are selected such that as mirror 14 sweeps through the optimum alignment position (the zero crossing of the θ(t) graph) the mirror will be at or sufficiently close to the optimum alignment long enough that a laser pulse can develop in resonator 12 in response to the applied RF pulse. The pulse will be delivered from the resonator via mirror 16. While the mirror is not in this at-or-close-to optimum alignment position gain will build-up in the resonator.

In a practical example wherein $\theta_m$ is about 5 degrees, the mirror will be in the at-or-close-to alignment condition during any one oscillation cycle of the mirror for less than about one-hundredth of the cycle time. In the example of FIG. 2, a laser pulse $P_1$ is generated at time $t_1$ as mirror 14 is in a negative-going sweep, a laser pulse $P_2$ is generated at time $t_2$ as the mirror is in a positive-going sweep, and a laser pulse $P_1$ is generated at time $t_3$ as mirror 14 is again in a negative-going sweep. No further pulses can be generated after time $t_4$ when the RF pulse is terminated. In this example, pulse $P_1$ has a lesser peak power that pulses $P_2$ and $P_3$, as pulse $P_1$ was initiated when there was less time for gain to build-up in the lasing gas of the resonator. A timing of the RF pulse that allows all pulses to have the same peak power can readily be determined experimentally.

Figure 2A:
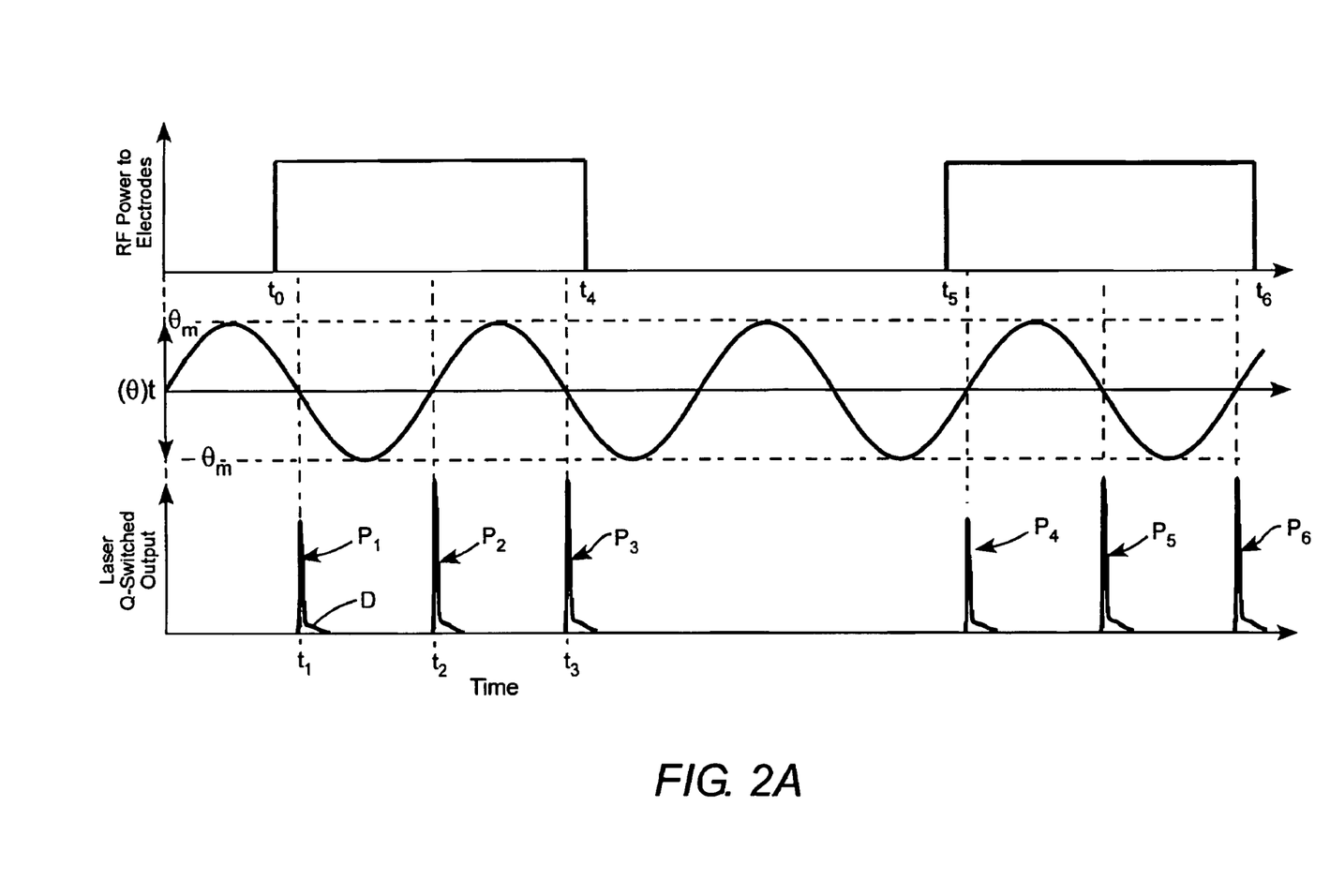
FIG. 2A is a timing diagram schematically illustrating the example of operation of the laser of FIG. 1, wherein the resonator is energized by two RF pulses with three laser pulses being generated during each of the RF pulses.

In the operating scheme of FIG. 2 bursts of pulses can be generated with mirror 14 continually oscillating and RF power being applied to the electrode of resonator 12 in pulses, with the duration of the pulses being selected according to the desired number and PRF of pulses in each burst. In what is termed super-pulsed operation, the peak power of the laser pulse is higher, for example twice as high, as the average CW power of the power supply delivering the pulse. The duty cycle of the pulses is selected such that the time-averaged pulse power is equal to the CW power. The PRF of pulses in each burst will be equal to 2f, i.e., twice the oscillating frequency of mirror 14. This burst mode of operation is a preferred mode of operation in certain material processing applications such as drilling holes. FIG. 2A illustrates pulses $P_1$, $P_2$, and $P_3$ delivered as a first burst of pulses with RF power applied between times $t_0$ and $t_4$, and $P_4$, $P_5$, and $P_6$ delivered as a second burst of pulses with RF power applied between times $t_5$ and $t_6$. The time between the bursts is greater than the time between sequential pulses in the bursts.

Optimum-Q-switching using the oscillating mirror of FIG. 1 can be defined as a condition wherein the output pulses $P_1$, $P_2$, $P_3$, and the like produced by the scanning mirror 14 have characteristics similar to those of pulses produced by a conventional CdTe, EO Q-switch. In U.S. patent application Ser. No. 11/434,624, filed May 16, 2006 by Spinelli et al., assigned to the assignee of the present invention, and the complete disclosure of which is hereby incorporated by reference, mechanically Q-switching a continuously pumped (end-pumped) solid-state laser with a micro-electro-mechanical system (MEMS) mirror is described. It is disclosed that optimum Q-switching occurs when the resonator-mode cross-section is swept completely through the pumped cross-section of the solid-state gain-medium in twice the build-up time of the resonator. This can be defined as the optimum sweep-time corresponding to an optimum sweep-rate. The build-up time is defined as the time required for a laser pulse to build-up to peak power, under conventional Q-switching operations, once the resonator is enabled (opened) by the conventional Q-switch. In the laser described, the solid-state gain-medium was at an opposite end of the laser resonator to the MEMS mirror and occupied only about 5% of the resonator length. Computed examples of Q-switched pulses produced at half the optimum sweep time (sweep rate) and twice the optimum sweep time are described. Pulses at the slowest, optimum and fastest sweep rates had about the same bandwidth and about the same beam cross-section in the far field. Pulses generated at faster-than-optimum sweep-rates and slower-than-optimum sweep-rates peaked respectively before and after the zero-crossing time.

It is difficult to apply the Spinelli et al criteria to a $CO_2$ laser such as laser 10 of FIG. 1, as in such a $CO_2$ laser, the gain-medium (energized lasing gas) occupies more than 90% of the space between terminating mirrors of the resonator. Further, the width of the energized gain medium in a waveguide $CO_2$ laser is about an order of magnitude greater than that in a solid-state laser described in the above-reference Spinelli et al. application. Accordingly, an experiment was performed to determine the minimum misalignment angle on any side of optimum alignment that would prevent lasing in a laser resonator similar to that depicted in FIG. 1, with a view to considering that minimum-misalignment angle as the angle that must be swept by the oscillating mirror in the resonator build-up time to provide optimum Q-switching. The laser used for the experiment was a prior-art model C-55 laser available from Coherent Inc. of Santa Clara, Calif. One end-mirror (terminating mirror) of the resonator was tilted using alignment screws provided. The tilt was measured using a helium-neon (red) laser beam reflected off the back of the mirror onto a wall on which an angular scale had been drawn.

The Coherent® C-55™ $CO^2$ laser has an optical cavity (resonator) total length of about 56.1 inches (1.43 meters). The optical cavity is folded in the Z-shaped pattern of laser 10 of FIG. 1 with each arm having a length of about 18.7 inches. The full aperture of the wave-guide channels machined in the ceramic slab is 0.110 inches, yielding a half-angle of 0.05 degrees ($9.8 \times 10^{-4}$ radians) looking back from the center of the mirror that was manually tilted to the center of the output coupling mirror. The angle φ between the folded channels is about 4.0 degrees. The output power of the laser was 71 W when optimally aligned.

It was found that the output power decreased about parabolically as the angle of mirror misalignment was increased from the optimum alignment position. The output power was found to fall to zero at an angle between about ±2 and ±3 milliradians (between about ±0.115 and ±0.172 degrees) of misalignment. The mode-quality deteriorated from a round beam to a beam with multiple side-lobes as the mirror misalignment angle was increased past the optimum alignment position.

Figure 3:
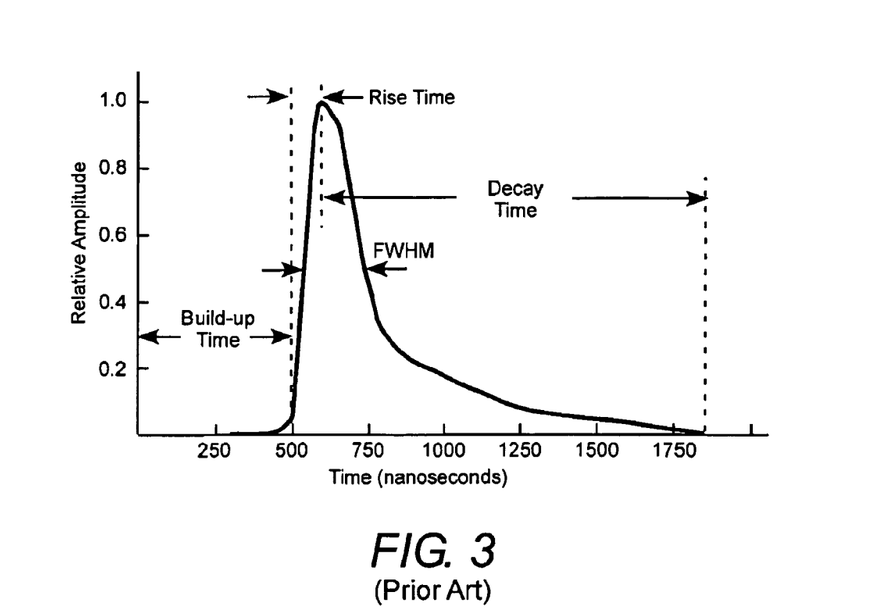
FIG. 3 is a graph schematically illustrating relative amplitude as a function of time in a Q-switched pulse generated in a prior-art Q-switched, waveguide $CO_2$ laser wherein Q-switching is effected by a CdTe E-O Q-switch.

FIG. 3 is a graph schematically illustrating the temporal shape of a conventionally Q-switched pulse from a prior-art waveguide $CO_2$ laser. Depending on the resonator gain, the resonator build time for such a pulse is between 300 and 500 nanoseconds (ns). The laser pulse rise-time is usually between about 100 and 150 ns. The full pulse-width at half of the maximum amplitude (FWHM) is usually between about 100 and 175 ns. The time from the peak of the pulse to the end of the radiation in the pulse "tail" is approximately 1.1 to 1.4 microseconds (μs).

Assuming a 500 ns build-up time and a mean, zero-power misalignment angle of 2.5 milliradians (mrad) an optimum sweep time according to the above referenced Spinelli et al. criterion is about 5000 radians/second (rad/s). Galvanometer drives capable of oscillating a mirror at a frequency of up to 16 KHz with a maximum excursion angle of up to 5 degrees are commercially available for example a Model SC-30™ Resonant Scanner from Electro Optical Products Corporation of Glendale, N.Y. Greater angular excursions are available at lower frequencies. The angular sweep rate dθ/dt of such an oscillating mirror is given by an equation:

$$d\theta/dt = 2\pi\theta_m f \cos(2\pi f t) \quad (2)$$

which is obtained by differentiating the right-hand side of equation (1) as a function of time. Substituting 16 KHz for the frequency (f) and about 0.0873 radians (5 degrees) for $\theta_m$ in equation (2) gives a maximum sweep rate of about 8773 rad/s when $\cos(2\pi f t)$ is equal to 1.0, as would be the case at the zero crossings of the θ(t) sinusoidal curve of FIG. 2. Adjusting $\theta_m$ to a value of about 0.0498 radians (about 2.85 degrees) would provide a peak sweep rate of 5000 rad/s.

Q-switching with such a 16 KHz galvanometer-driven mirror used as mirror 14 in the laser of FIG. 1 would provide output pulses at a PRF of 32 KHz. This certainly exceeds the 20 KHz that is often considered a minimum PRF for above discussed laser machining operations but falls short of the 100 KHz required for optimized efficient operation of the laser. A description of apparatus capable of output-pulse PRF greater than 32 KHz, using the same galvanometer, is set forth below beginning with reference to FIG. 4.

Figure 4:
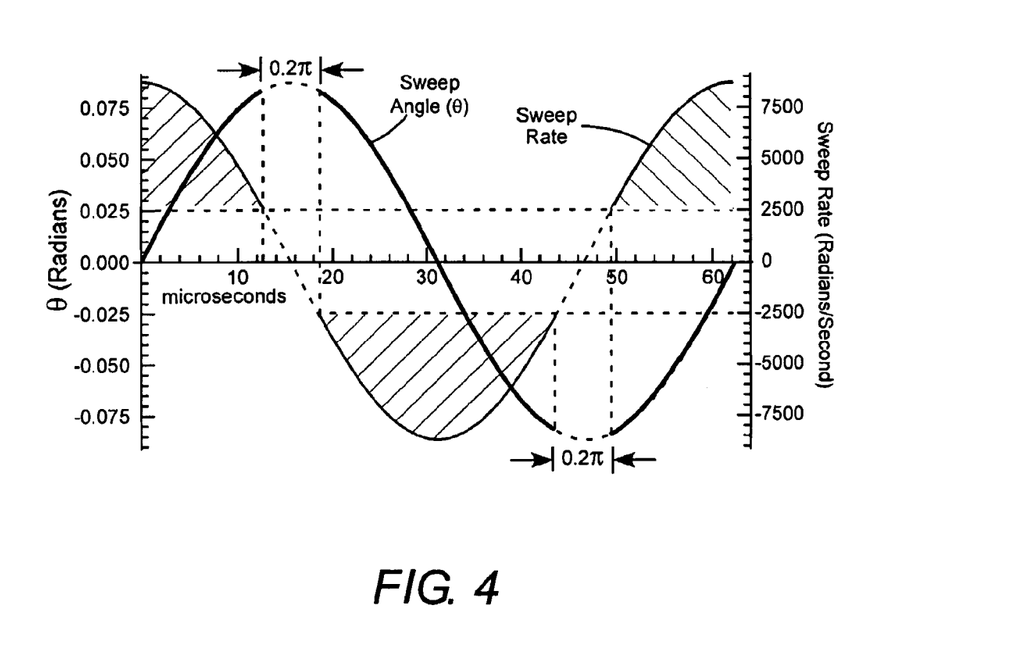
FIG. 4 is a graph schematically illustrating scan angle and scan rate as a function of time in the oscillating mirror arrangement of FIG. 1, wherein f is 16 KHz and $\theta_m$ is 5 degrees, and depicting a relatively small portion of an oscillation cycle around $\theta_m$ during which the sweep rate might be considered as less than in a range suitable for effective Q-switching.

FIG. 4 is a graph schematically illustrating the sweep (misalignment) angle as a function of time during one oscillation cycle (2π) of a mirror arranged as mirror 14 in FIG. 1 together with the corresponding sweep rate as a function of time during that cycle. It is assumed that $\theta_m$ is 5 degrees (0.0873 radians). If it is assumed that Q-switching will still be effective at rates of 0.5 and 2.0 times the optimum rate of 5000 rad/sec, then the sweep rate of the mirror is effective, if not optimum, for Q switching through most of the oscillation cycle of the mirror.

This is depicted in FIG. 4 by the shaded portions under the sweep-rate curve and corresponding portions in bold line on the sweep-angle curve. Here, the sweep angle is only outside of that required for effective Q-switching during two short sections (indicated by dotted lines) of about 0.2 angular width centered about the maximum excursion ($\theta_m$) positions of the mirror. This would be the case if $\theta_m$ was increased such that the peak sweep rate (at the zero crossing) was equal to 10000 rad/s. If the peak sweep rate were further increased, then portions of the angular excursion of the mirror about the zero crossing would be outside the range for which Q-switching is effective, at least according to the criterion being considered.

Figure 4A:
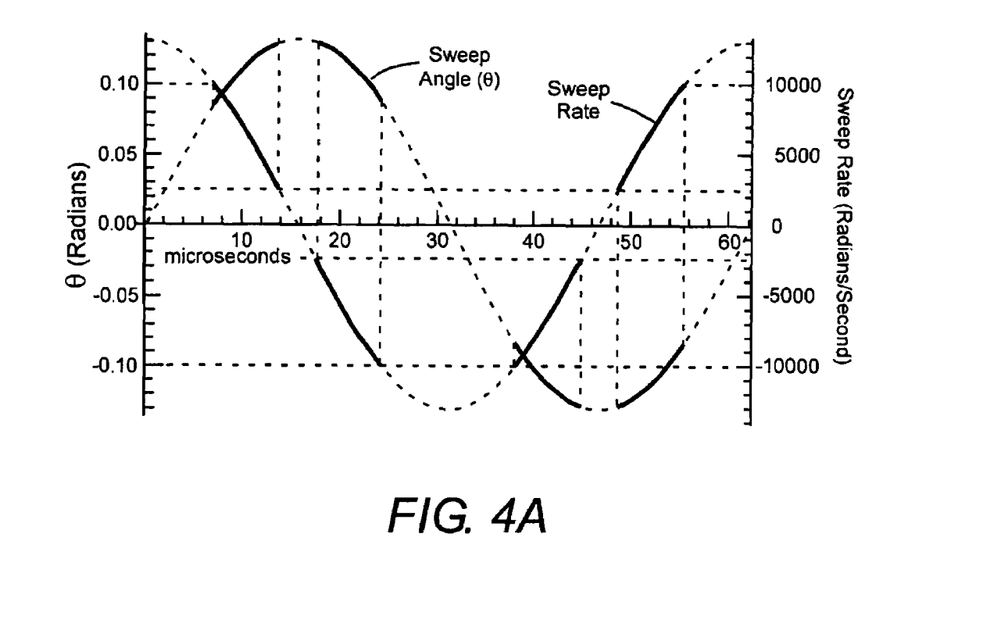
FIG. 4A is a graph schematically illustrating scan angle and scan rate as a function of time in the oscillating mirror arrangement of FIG. 1 wherein f is 16 KHz and $\theta_m$ is 7.5 degrees, depicting a relatively small portion of an oscillation cycle around $\theta_m$ during which the sweep rate might be considered as being less than in a range suitable for effective Q-switching, and a larger portion of the oscillation cycle around the zero-crossing during which the sweep rate might be considered as being greater than in a range suitable for effective Q-switching.

By way of example, FIG. 4A is a graph similar to the graph of FIG. 4 but schematically depicting a case in which $\theta_m$ has been arbitrarily increased to 7.5 degrees, such that the peak sweep rate is in excess of twice the assumed optimum rate. Bold portions of the sweep-rate curve show portions of that curve that fall within the arbitrary requirement of a sweep rate between 0.5 times and 2.0 times the optimum rate. Bold portions of the sweep-angle curve show corresponding usable portions of that curve. An optimum condition (most usable sweep angles) would be achieved when $\theta_m$ was set such that the peak sweep rate was equal to twice the optimum sweep (or whatever other maximum was considered to provide acceptable results).

Figure 5:
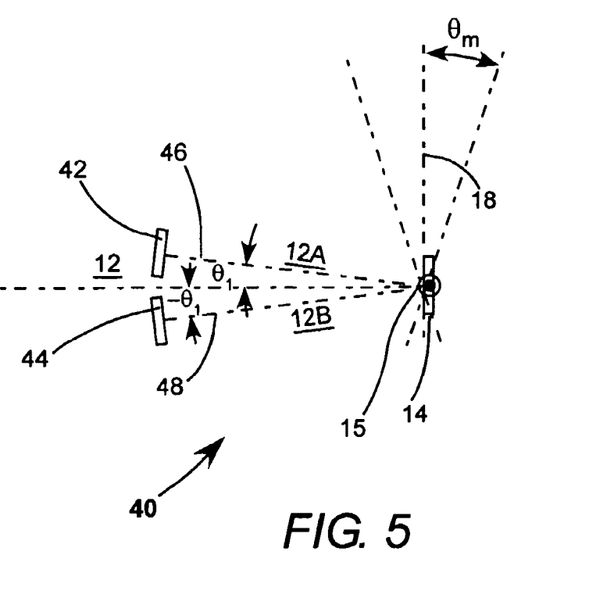
FIG. 5 schematically illustrates another preferred embodiment of a mechanically Q-switched, $CO_2$ laser in accordance with the present invention, similar to the arrangement of FIG. 1 but wherein there are first and second additional mirrors disposed symmetrically about the resonator axis and arranged to terminate the resonator at times during the oscillation cycle of the Q-switch mirror when the sweep angle of the Q-switch mirror is between $\theta_m$ and the zero-crossing.
Figure 6:
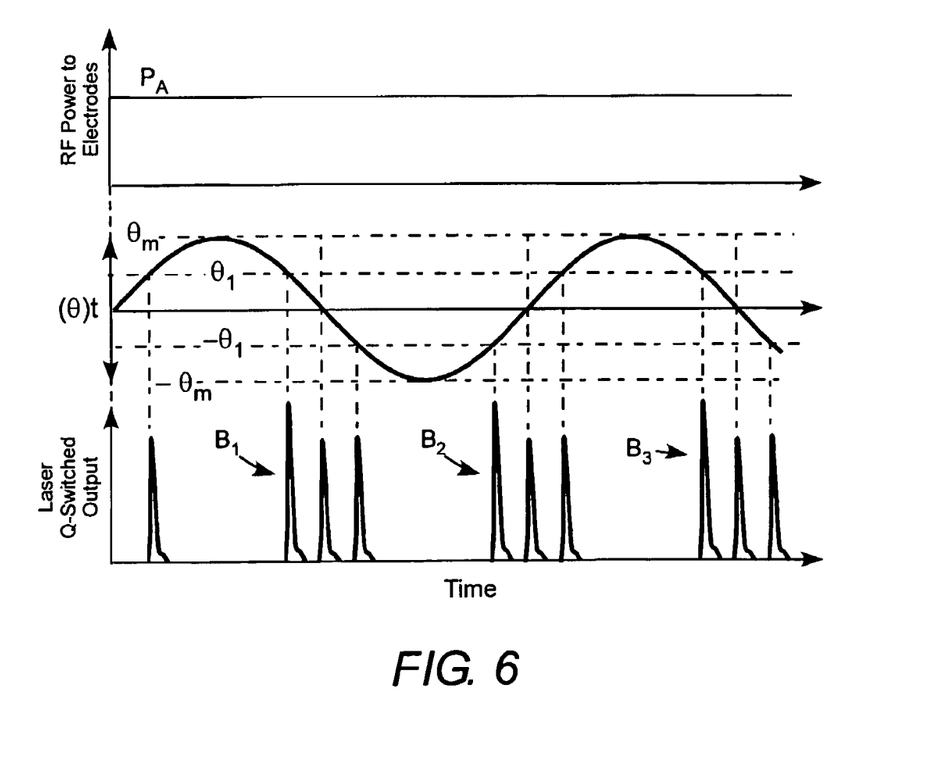
FIG. 6 is a timing diagram schematically illustrating one example of operation of the laser of FIG. 5, wherein the resonator is energized continuously by RF power and with laser pulses being generated in bursts of three thereof, with a second pulse in each burst being generated when the Q-switch mirror is swept through a zero-crossing point of the sweep function thereof when the resonator is terminated by the Q-switch mirror, and with the first and third pulses being generated when the sweep angle of the Q-switch mirror is between $\theta_m$ and the zero-crossing on opposite sides thereof with the resonator being terminated by respectively the first and second additional mirrors.

FIG. 5 schematically illustrates apparatus 40 in accordance with the present invention that takes advantage of the condition depicted in FIG. 4 for increasing the PRF of mechanically Q-switched pulses beyond 32 KHz while still deploying a galvanometer mirror with an oscillation frequency of only 16 KHz. FIG. 6 is a timing diagram schematically illustrating operating principles of the apparatus. In FIG. 5 only the end of laser apparatus including oscillating mirror 15 is illustrated for simplicity of description. In apparatus 40, oscillating mirror 14 terminates a $CO_2$ resonator 12 when the mirror is in a small range of angles about an optimally aligned position as discussed above with reference to FIGS. 1 and 2. It is assumed here (see FIG. 6, upper graph) that the resonator is energized by continuously-applied RF power at an average power $P_A$. It is also assumed that the maximum angular excursion of mirror 14 from optimal alignment plane 18 is $\theta_m$.

Mirrors 42 and 44 are arranged such that normals 46 and 48, respectively, thereto intersect with axis 13 of resonator 12 at angles $+\theta_1$ and $-\theta_1$ respectively thereto on the surface of mirror 14. Angle $\theta_1$ is less than $\theta_m$, but greater than the minimum misalignment angle of mirror 14 (with respect to axis 13). Mirrors 42 and 44 can be considered as temporary (end) mirrors of resonator 12 in (once-more folded) configurations 12A and 12B respectively, thereof. Mirror 14, of course, functions as a (oscillating) fold-mirror for these configurations of resonator 12.

Referring again to FIG. 6, angle $\theta_1$ is selected such that after a pulse is delivered by resonator 12 terminated by mirror 14, another pulse can be delivered by resonator 12 in configuration 12A or 12B thereof before mirror 14 reaches the maximum excursion angles $\theta_m$ or $-\theta_m$ respectively. Accordingly, pulses are delivered in bursts of three pulses, for example, bursts $B_1$, $B_2$ and $B_3$ of FIG. 6. In this particular arrangement, first and third pulses in each burst are generated in resonator configurations 12A and 12B respectively, and the second pulse in each burst is generated in resonator configuration 12, at about the "zero-crossing" (of the θ(t) curve) of mirror 14. The first-generated pulse in each burst will have greater amplitude than the second and third pulses because the resonator gain has time to build up between the delivery of the last pulse in one burst and the first pulse in the next burst. The time-averaged PRF of the bursts will be six times the oscillating frequency of mirror 14, for example, a PRF of 96 KHz for an oscillating frequency of 16 KHz.

Grouping of the Q-switched pulses in bursts for material processing applications is sometimes advantageous if the time separation between the pulses is shorter than the thermal time constant of material being processed. Providing the first pulse in a burst with more energy than subsequent pulses in the burst pulses may also be advantageous because this pulse firmly and quickly initiates a plasma, thereby making it easier to couple energy from the subsequent pulses into the work piece. By selecting an appropriate value for $\theta_1$, of course, it would be possible to arrange that instead of burst of pulses a sequence of about temporally equally-spaced pulses, having about equal amplitude at a frequency of 6f was obtained.

Referring back to FIG. 4, in order for operating mode of FIG. 6 and like modes to be possible, angle $\theta_1$ must be selected, cooperative with angle $\theta_m$ and the oscillating frequency f of mirror 14 such that angle $\theta_1$ lies on the "useable" part of the sweep-angle in a curve such as the curve of FIG. 4, whatever criterion for "useable" sweep-rates is adopted. It should be noted, here, however, that when oscillating mirror 14 is functioning as a fold mirror, the sweep rate of the laser mode over mirrors 42 and 44 will be twice (angle of incidence plus angle of reflection) the actual sweep rate of the oscillating mirror. It should also be noted, regarding the arrangement of mirrors 42 and 44 for providing a sequence of temporally equally-spaced pulses, that pulses generated when sweep-rates slower or faster than optimum will peak, respectively, slightly earlier or slightly later than the optimum alignment time. This can be taken into account when selecting positions for mirrors 42 and 44.

Figure 7:
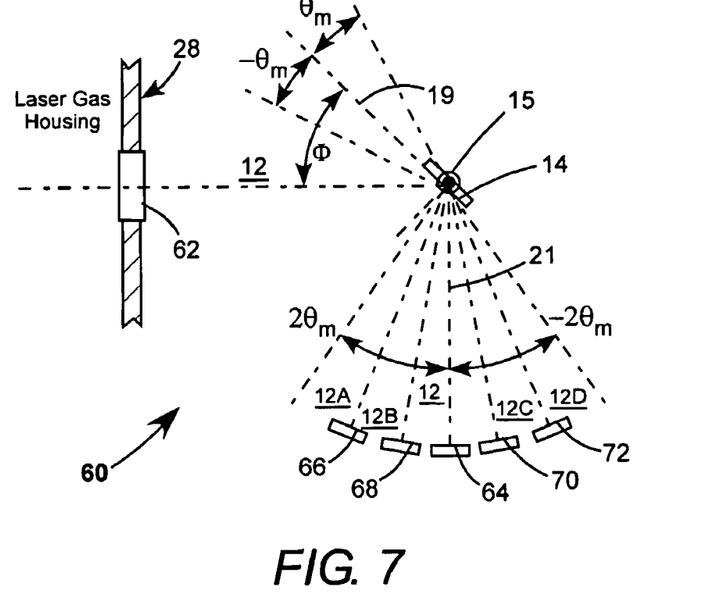
FIG. 7 schematically illustrates still another preferred embodiment of a mechanically Q-switched, $CO_2$ laser in accordance with the present invention, similar to the arrangement of FIG. 1 but wherein the oscillating Q-switch mirror functions only as an oscillating fold-mirror of the laser resonator and wherein there first, second, third, fourth, and fifth additional mirrors sequentially terminating a laser resonator at times during the oscillation cycle of the Q-switch mirror, with the output-coupling mirror, the additional mirrors and the Q-switch mirror cooperative such that the laser outputs ten laser pulses during each oscillation cycle of the Q-switch mirror.

FIG. 7 schematically illustrates yet another embodiment 60 of mechanically Q-switched $CO_2$ laser apparatus in accordance with the present invention. In this embodiment of the present invention, oscillating mirror 14 is arranged outside of the gas enclosure 28 of the laser and communicates with the waveguide and the remainder of resonator 12 (not shown) via a window 62. Mirror 14 is used only as an oscillating fold-mirror, i.e., the mirror never terminates a resonator during an oscillation cycle. Mirror 14 oscillates with maximum angular excursions of $\pm\theta_m$ from a nominal incidence-plane 19 of the mirror inclined at some angle $\Phi$ (here 45°) to resonator axis 12 as the resonator axis leaves window 62.

Oscillation of mirror 14 sweeps the resonator axis through maximum angular excursions of $\pm 2\theta_m$ from a nominal direction 21. Accordingly the sweep rate at any time is twice the sweep rate of mirror 14. Mirrors 64, 66, 68, 70 and 72 are arranged to receive the swept resonator axis during an oscillation cycle of mirror 14. Mirror 64 can be defined as terminating a nominal, central resonator 12, while mirrors 66, 68, 70, and 72 terminate supplementary configurations 12A, 12B, 12C, and 12D respectively of resonator 12. Mirrors 64, 66, 68, 70 and 72 can be defined as temporary resonator end mirrors as the mirrors "take turns" in terminating resonator 12. This arrangement would provide pulses at a PRF of 100 KHz with an oscillation frequency f of mirror 14 of 10 KHz. The angular position of the mirrors and can be selected, as discussed above, to provide repeated bursts of pulses, or a continuous sequence of pulses that are about temporally equally-spaced.

One disadvantage of the arrangement of FIG. 7 is that each of the mirrors 64, 66, 68, 70, and 72 in practice must be on a separate mirror mount with provisions for fine alignment of the mirror. Depending on the distance of these mirrors from mirror 14, this can provide a minimum limit on the angular separation of the axes of the nominal and the supplementary resonators. A description of one means of overcoming this disadvantage is set forth below with reference to FIG. 8.

Figure 8:
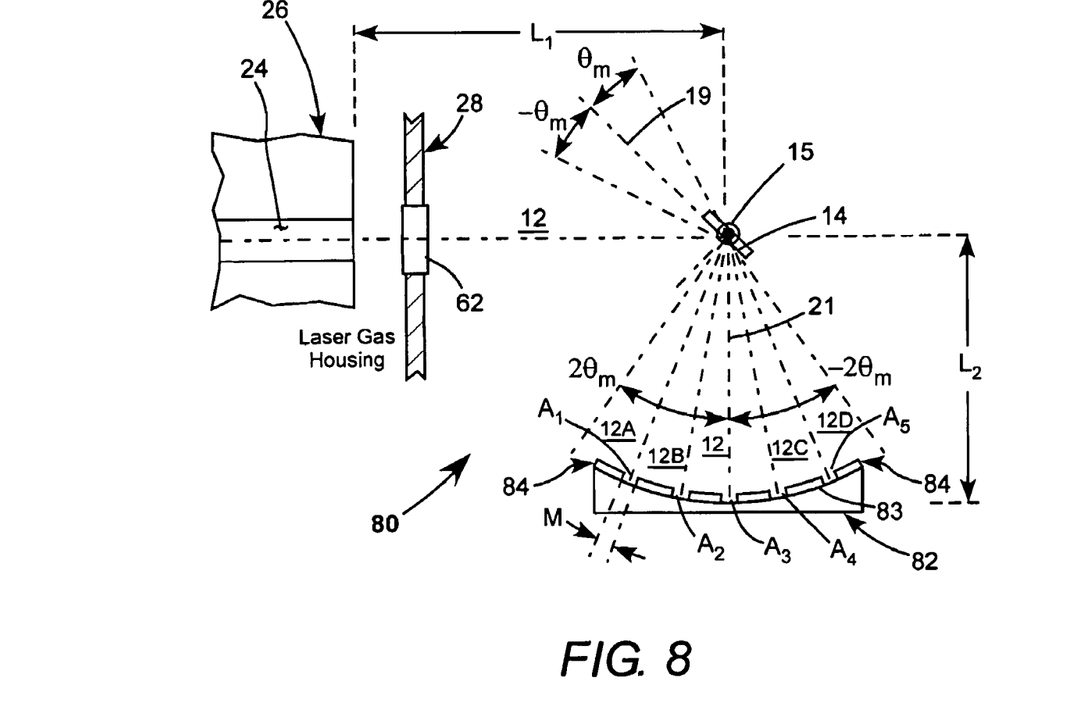
FIG. 8 schematically illustrates a further preferred embodiment of a mechanically Q-switched, $CO_2$ laser in accordance with the present invention, similar to the arrangement of FIG. 8 but wherein the five additional mirrors are replaced by a concave reflecting surface covered by a mask having five apertures therein aligned in the sweep direction of the oscillating Q-switch mirror.

FIG. 8 schematically illustrates still another embodiment 80 of mechanically Q-switched $CO_2$ laser apparatus in accordance with the present invention. Apparatus 80 is similar to apparatus 60 of FIG. 7 with an exception that the separate resonator-terminating mirrors 64, 66, 68, 70, and 72 of apparatus 70 are replaced by a single concave mirror 82, covered by a non-reflective (for the laser wavelength) mask 84 having apertures $A_1, A_2, A_3, A_4,$ and $A_5$ therein, each thereof exposing a portion of the reflective surface 83 of the mirror. The apertures preferably each have width M about equal to the mode-width of the laser on surface 83 of mirror 82. One preferred material for fabricating mask 84 is anodized aluminum. It is also possible to fabricate the mask from a ceramic such as alumina.

An advantage of the mirror and mask arrangement of FIG. 8 is that mask 84 could be changed to obtain a different number and grouping of Q-switched pulses more conveniently than the separate mirror arrangement of FIG. 7. It is also possible to adjust time separation between the pulses by moving the mask toward oscillating mirror 14.

Regarding selection of a radius of curvature for reflective surface 83 of mirror 82, this can be complicated in the case of a waveguide laser because laser radiation at the exit of a wave-guide channel does not have a Gaussian distribution. This complicates coupling efficiently from free space back into the waveguide channel.

A beam leaving a waveguide channel assumes a Gaussian distribution having propagated some distance, for example about 15 cm or greater, from the waveguide channel.

It is possible to calculate the wave-front radius of a Gaussian beam at a particular distance from the waveguide channel. In one case of mirror 82 this would be the optical path from the exit of waveguide channel 24 in ceramic block 26 to surface 83 of the mirror, i.e., the sum of distances $L_1$ and $L_2$ in FIG. 8. This calculated radius is then selected as the radius of curvature for surface 83 of mirror 82. As this radius is an approximation to the Gaussian radius, it advisable to adjust the distance L2 with mirror 14 stationary in plane 19 until maximum output power is obtained from the laser.

Another approach is to make $L_1$ and $L_2$ initially equal and make the radius of surface 83 of mirror 82 equal to $L_1$ (or $L_2$). This images the waveguide exit back on its self. Fine adjustment can be performed as described above but by adjusting both $L_1$ and $L_2$. Those skilled in the art may employ other methods of selecting the mirror radius without departing from the spirit and scope of the present invention.

Figure 9:
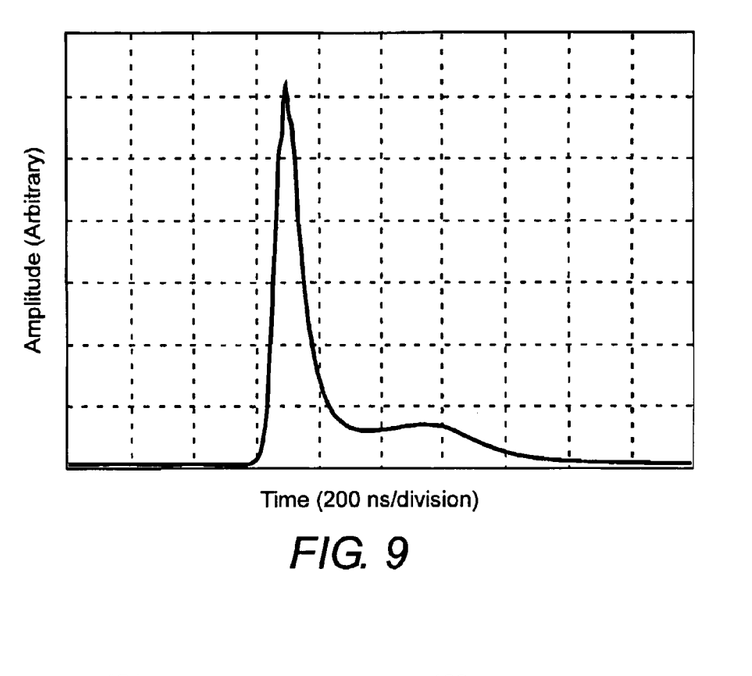
FIG. 9 is a graph schematically illustrating measured relative amplitude as a function of time for a Q-switch pulse generated in one example of a mechanically Q-switched, waveguide $CO_2$ laser in accordance with the present invention, similar to the laser of FIG. 1, but wherein the resonator is six-times folded through seven waveguide channels.

FIG. 9 is a graph reproduced from an oscilloscope trace schematically illustrating a pulse formed by one example of a mechanically Q-switched, pulsed, waveguide $CO_2$ laser in accordance with the present invention configured to experimentally evaluate the effectiveness of mechanically Q-switching in accordance with the present invention. The laser was a waveguide laser with seven (7) channels folded in a zigzag pattern. Each channel had a length of about 18.7 inches for a total gain length of about 130.9 inches. The waveguide channel cross-section was 0.11 inches by 0.11 inches. Wavelength-selective coatings were provided on folding mirrors of the laser-resonator to force the laser to deliver radiation at a wavelength of 9.3 μm. This wavelength is preferred for machining plastics. The laser was a modified version of a conventionally (EO) Q-switched laser, at the same wavelength, that, in the conventionally Q-switched form, provided 23 W average power output at a frequency of 100 KHz. In the modified form the EO Q-switch switch was removed. An oscillating mirror driven by a galvanometer having a resonant frequency of 9.59 KHz replaced the normal resonator-terminating mirror. The mirror had a silicon substrate 4 mm high by 4 mm wide and having a thickness of 1 mm. An enhanced reflectivity gold coating on the mirror provided a reflectivity greater than 99% at a wavelength of 9.3 μm. The galvanometer drive was the above referenced SC-30 model available from Electro-Optical Products Corporation (EOPC) of Glendale, N.Y.

A ZnSe window was added to the laser housing in the location where the conventional mirror had been removed. This allowed the galvanometer driven mirror to be located outside the laser housing. The maximum angular excursion selected for the experiment was ±5 degrees. Oscillating mirror functioned as depicted in FIG. 2, i.e., with pulses being generated at twice the oscillating frequency of the mirror only at about the zero crossings of the mirror. An exception, however, was that RF pump power was continuously applied.

The average power obtained was 13 W at a wavelength of 9.3 microns and at a PRF=19.18 KHz. Taking into account the lower PRF this compares favorably with the power obtainable in the conventionally Q-switched version. The FWHM of the pulses was 94.09 nsec. The rise time of the pulse was about 100 ns and the decay time (from the peak to the end of the pulse "tail") was about 900 ns to 1 ms, which again compares favorably with characteristics of the EO Q-switched version of the laser.

As the maximum angular excursion of the oscillating mirror was reduced below ±5 degrees, the peak-power of the pulses was reduced, the amount of radiation in the tail of the pulses increased, and the average output power increased. As the maximum angular excursion of the oscillating mirror was increased, the energy in the tail of the pulses was reduced, the peak power was increased, but the pulse energy was reduced. Clearly the inventive mechanical Q-switching method approach provides one means of adjusting the amount of energy in Q-switched pulses.

While principles of the present invention are described above in the context of a waveguide $CO_2$ laser, the invention is not limited in its application to such a laser. Indeed, the "apertured mirror" arrangement of FIG. 8 is particularly applicable to $CO_2$ lasers having free-space Gaussian-mode resonators that are folded between two slab electrodes. The electrodes are used to energize lasing gas in the resonator in a manner similar to that discussed above with reference to laser 10 of FIG. 1.

Figure 10:
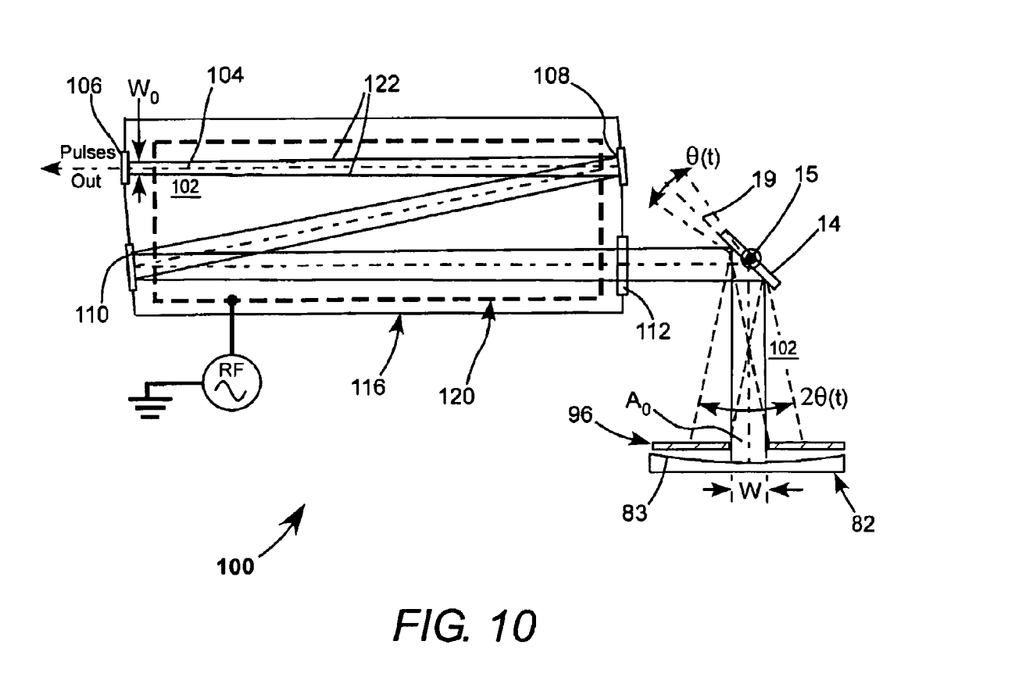
FIG. 10 schematically illustrates an embodiment of a free-space, Gaussian-mode laser in accordance with the present invention having the mechanical Q-switching arrangement of the laser of FIG. 8, but wherein the mask has only one aperture therein and only two pulses are generated per oscillation cycle of the Q-switch mirror when the resonator is energized.

By way of example FIG. 10 schematically illustrates a further embodiment 100 of a mechanically Q-switched laser in accordance with the present invention. Laser 100 includes a folded half-symmetric Gaussian-mode resonator 102 having a (folded) longitudinal resonator-axis 104. The resonator is terminated by a plane output coupling mirror 106 and a mirror 82 having a concave reflecting surface 83 as discussed above with reference to laser 80 of FIG. 8. Resonator-axis 104 is folded by fixed mirrors 108 and 110, and an oscillating mirror 14 arranged as discussed above with reference to laser 80. A housing 116 containing a $CO_2$ laser gas mixture encloses most of the resonator. Laser gas therein is energized by RF power applied to slab electrodes 120, indicated in phantom in FIG. 10. Mirrors 106, 108, and 110 are alignably sealed to enclosure 116. Mirrors 82 and 14 are located outside the enclosure and communicate with the rest of the resonator through a window 112 sealed to the housing.

A radius of curvature can be selected appropriate to the total optical length of resonator 102 with according to known principles of Gaussian resonators. In a "hemispherical" resonator such as resonator 102, a ratio of resonator-length to radius-of-curvature can be selected such that the lasing mode (indicated in FIG. 10 as bounded by solid lines 122) has a narrow waist $W_0$ adjacent plane mirror 16, expanding in an about hyperbolic envelope to a widest portion W on surface 83 of mirror 82. $W_0$ and W can be calculated according to known formulas from the ratio of resonator-length to radius-of-curvature, the lasing wavelength, and the resonator length. By way of example, a resonator 102 having a total length of 150 centimeters (cm) with surface 83 of mirror 82 having a radius of curvature of 200 cm, and for a lasing wavelength of 10.6 µm, $W_0$ will be about 1.71 mm and W will be about 3.42 mm.

In front of surface 83 of mirror 82 is a mask 96 having a single aperture $A_0$ therein. Aperture $A_0$ is disposed symmetrically about the resonator axis when this axis angularly bisects the total angle ($4\theta_m$) through which mirror 14 scans the resonator-axis over the mask. The aperture preferably has diameter about equal to the mode-width W on surface 83 of mirror 82. This arrangement will produce pulses at the zero-crossings of the scan angle curve, here, given by the sinusoidal function $2\theta(t)$, i.e., where the scan rate is at a maximum. This mode of operation is comparable to the mode depicted in FIG. 2 for laser 10, except for the doubling of the scan rate resulting from using mirror 14 as a fold-mirror. It is believed that optimum Q-switching will occur when the sweep time of the resonator axis across aperture $A_0$ occurs in twice the build-up time of the laser resonator.

Laser 100 can be operated continuously pumped to provide a continuing sequence of pulses at a PRF twice the oscillation frequency of mirror 14, or can be operated in a super-pulsed mode as illustrated in FIG. 2 to produce bursts of pulses. Mask 96 can be replaced with a mask having a plurality of apertures therein in the manner of mask 84 in laser 80 of FIG. 8. The apertures of course would be aligned in the scan direction and each would preferably have a diameter about equal to mode width W.

The present invention is described above in terms of a preferred and other embodiments. The invention is not limited, however, to the embodiments described and depicted. Rather, the invention is limited only by the claims appended hereto.

What is claimed is:

1. A gas laser comprising:
    an enclosure containing a laser gas;
    a laser resonator including first and second resonator end-mirrors and having a longitudinal resonator-axis, the resonator axis-extending through the lasing gas in the enclosure;
    an electrical pumping arrangement for energizing the laser gas; and
    wherein the first mirror is oscillatable in a back and forth manner at a predetermined frequency about an axis perpendicular to the longitudinal resonator-axis through an angular range of oscillation traveling from one side of an optimal alignment plane of the mirror to the other and back again, with the frequency of oscillation of the first mirror and the angular range of oscillation being selected such that when the laser gas is energized by the electrical pumping arrangement and the first mirror is oscillating, the laser delivers a laser pulse twice during each oscillating period of the first mirror.

2. The laser of claim 1, wherein the predetermined oscillating frequency of the first mirror is about 10 KHz and the angular range of oscillation of the first mirror extends about 5 degrees on each side of the optimum alignment plane.

3. The laser of claim 1, wherein the electrical pumping arrangement is arranged to energize the laser gas periodically, with the periods during which the laser gas is energized and the periods therebetween being selected, cooperative with the predetermined oscillation frequency, such that laser pulses are delivered in bursts of two or more thereof, with the time period between the bursts being greater than the time period between pulses in the bursts.

4. The laser of claim 1, wherein the laser resonator extends through a waveguide located in the enclosure.

5. The laser of claim 1, wherein the longitudinal resonator-axis is folded into two or more arms at an angle one-to-the next by one or more fold-mirrors.

6. The laser of claim 5, wherein the longitudinal resonator-axis is folded into first, second, and third arms by first and second fold-mirrors.

7. The laser of claim 6, wherein the first, second, and third arms of the longitudinal resonator-axis extend through respectively first, second, and third waveguide-arms located in the enclosure.

8. The laser of claim 1, wherein the first resonator end-mirror is located outside of the enclosure.

9. The laser of claim 1, wherein the laser pulses are delivered from the resonator via the second-resonator mirror.

10. A gas laser comprising:
an enclosure containing a laser gas;
a laser resonator having a longitudinal resonator axis-extending through the lasing gas in the enclosure; the laser resonator including first, second, and third mirrors;
the first mirror terminating the resonator at a first end thereof;
the second mirror being oscillatable at a predetermined frequency about an axis perpendicular to the longitudinal resonator-axis through an angular range of oscillation extending from one side of an optimal alignment plane of the mirror to the other and arranged to periodically sweep the resonator axis over the third mirror when the second mirror is oscillating; and
the third mirror being configured and arranged with respect to the first and second mirrors and with frequency of oscillation of the second mirror and the angular range of oscillation of the second mirror being selected such that when the laser gas is energized by the electrical pumping arrangement and the second mirror is oscillating, the laser resonator is terminated at a second end thereof by the third mirror twice during each oscillation period of the second mirror, with a laser pulse being delivered from the resonator each time the laser resonator is terminated at a second end thereof by the third mirror.

11. The laser of claim 10, wherein when the second mirror is in the optimum alignment plane the resonator is terminated at the second end thereof by the second mirror, and when the laser gas is energized by the electrical pumping arrangement and the second mirror is oscillating the laser resonator is terminated at a second end thereof by the second mirror twice during each oscillation period of the second mirror, with a laser pulse being delivered from the resonator each time the laser resonator is terminated at the second end thereof by the second mirror, whereby at least four pulses are delivered from the resonator during each oscillating period of the second mirror.

12. The laser of claim 11, wherein the laser pulses are delivered from the resonator via the first mirror.

13. A gas laser comprising:
an enclosure containing a laser gas;
a laser resonator having a longitudinal resonator axis-extending through the lasing gas in the enclosure; the laser resonator including first end-mirror, a second mirror, and an a plurality N of temporary end-mirrors;
the first end-mirror being a terminating mirror of the laser resonator at a first end thereof;
the second mirror being oscillatable at a predetermined frequency about an axis perpendicular to the longitudinal resonator-axis through an angular range of oscillation extending from one side of a nominal alignment plane of the mirror to the other and arranged to periodically sweep the resonator axis over the plurality of temporary end-mirrors when the second mirror is oscillating, the nominal alignment plane of the second mirror being at a non-orthogonal angle to the longitudinal resonator-axis; and
the plurality of temporary end-mirrors being configured and arranged with respect to the first and second mirrors and with the frequency of oscillation of the second mirror and the angular range of oscillation of the second mirror being selected such that when the laser gas is energized by the electrical pumping arrangement and the second mirror is oscillating, the laser resonator is terminated at a second end thereof by each of the temporary end-mirrors twice during each oscillation period of the second mirror, with a laser pulse being delivered from the resonator each time the laser resonator is terminated at a second end thereof by one of the temporary end mirrors, whereby 2N pulses are delivered from the resonator during each oscillating period of the second mirror.

14. The laser of claim 13, wherein the nominal alignment plane of the second mirror is at an angle of 45 degrees to the resonator-axis.

15. The laser of claim 13, wherein the temporary end mirrors are spaced apart with a spacing therebetween selected cooperative with the oscillation frequency and angular range of oscillation of the second mirror, such that the pulses delivered by the laser are temporally equally spaced.

16. A gas laser comprising:
an enclosure containing a laser gas;
a laser resonator having a longitudinal resonator axis-extending through the lasing gas in the enclosure, the laser resonator including first, second and third mirrors;
a mask having at least one aperture therein located between the second mirror and the third mirror;
the first mirror being a terminating mirror of the laser resonator at a first end thereof;
the second mirror being oscillatable at a predetermined frequency about an axis perpendicular to the longitudinal resonator-axis through an angular range of oscillation extending from one side of a nominal alignment plane of the second mirror to the other and arranged to periodically sweep the resonator axis over the aperture in the mask when the second mirror is oscillating, the nominal alignment plane of the second mirror being at a non-orthogonal angle to the longitudinal resonator-axis; and
the third mirror and the aperture in the mask being configured and arranged with respect to the first and second mirrors and the frequency of oscillation of the second mirror and the angular range of oscillation of the second mirror being selected such that when the laser gas is energized by the electrical pumping arrangement and the second mirror is oscillating, the laser resonator is terminated at a second end thereof by a portion of the third mirror accessible by the resonator axis through the aperture in the mask twice during each oscillation period of the second mirror, with a laser pulse being delivered from the resonator each time the laser resonator is terminated at a second end thereof by that portion of the third mirror.

17. The laser of claim 16, wherein the mask includes only one aperture, and when the second mirror is in the nominal alignment plane, the aperture in the mask is symmetrically disposed about the resonator axis.

18. The laser of claim 16, wherein the aperture in the mask is one of a plurality of N apertures in the mask and wherein, when the second mirror is oscillating, the resonator axis is swept over the plurality of apertures in the mask with the resonator being terminated by the third mirror each time resonator axis is swept over one of the plurality of apertures in the mask, with a laser pulse being generated each time the laser is terminated by the third mirror, whereby 2N pulses are delivered from the resonator during each oscillating period of the second mirror.

19. The laser of claim 18, wherein the third mirror has a concave reflecting surface.

20. The laser of claim 19, wherein the concave reflecting surface of the third mirror has a radius of curvature about equal to the axial distance between the second mirror and the third mirror.

* * * * *